United States Patent [19]

Montanbault

[11] Patent Number: 5,623,374
[45] Date of Patent: Apr. 22, 1997

[54] SPRING DETENT FOR FOLDABLE SIDE MOUNT REAR VIEW MIRROR

[75] Inventor: Norman B. Montanbault, St. Clair Shores, Mich.

[73] Assignee: ADAC Plastics, Inc., Grand Rapids, Mich.

[21] Appl. No.: 212,872

[22] Filed: Mar. 15, 1994

[51] Int. Cl.⁶ ............................................ B60R 1/06
[52] U.S. Cl. .................... 359/841; 359/871; 359/881; 359/882; 248/549; 248/478; 248/521; 248/900; D8/395; D12/187; D12/223
[58] Field of Search ............................ 248/478, 549, 248/900, 73, 74.2, 231, 316.2, 477, 539, 540, 541, 548, 458, 474, 511, 521, 689, 218.4, 219.4, 916; 359/841, 842, 871, 872, 881, 875, 882, 533, 544, 548, 552, 553, 838, 843, 844, 849, 854, 865; 280/769, 762; D12/187, 223; D8/395

[56] References Cited

U.S. PATENT DOCUMENTS

| | | | |
|---|---|---|---|
| 2,408,168 | 9/1946 | Hofer | 248/479 |
| 2,716,012 | 8/1955 | Simmons | 248/231 |
| 2,939,364 | 6/1960 | Doswell et al. | 248/478 |
| 3,482,464 | 12/1969 | Reich et al. | 74/470 |
| 3,642,245 | 2/1972 | Wohnlich | 248/478 |
| 3,976,275 | 8/1976 | Clark | 248/487 |
| 3,981,474 | 9/1976 | Szilagyi | 248/466 |
| 4,077,597 | 3/1978 | Greig | 248/477 |
| 4,123,030 | 10/1978 | Johansson | 248/478 |
| 4,166,651 | 9/1979 | Vandenbrink et al. | 248/487 |
| 4,218,036 | 8/1980 | Pitkanen | 248/475 |
| 4,281,815 | 8/1981 | O'Connell et al. | 248/479 |
| 4,368,868 | 1/1983 | Urban | 248/549 |
| 4,500,063 | 2/1985 | Schmidt et al. | 248/475.1 |
| 4,623,115 | 11/1986 | Brester | 248/479 |
| 4,728,181 | 3/1988 | Kakinuma | 350/632 |
| 4,789,232 | 12/1988 | Urbanek | 350/632 |
| 4,793,582 | 12/1988 | Bronstein | 248/486 |
| 4,854,539 | 8/1989 | Glue | 248/479 |
| 4,909,619 | 3/1990 | Eifert | 350/636 |
| 4,988,178 | 1/1991 | Eifert | 350/631 |
| 5,005,797 | 4/1991 | Maekawa et al. | 248/479 |
| 5,028,029 | 7/1991 | Beck et al. | 248/479 |
| 5,227,924 | 7/1993 | Kerper | 359/875 |
| 5,273,314 | 12/1993 | Sakakibara | 248/548 |
| 5,292,100 | 3/1994 | Byers et al. | 359/874 |
| 5,432,640 | 7/1995 | Gilbert et al. | 359/841 |

FOREIGN PATENT DOCUMENTS

| | | | |
|---|---|---|---|
| 0115448 | 8/1984 | European Pat. Off. | 359/871 |
| 0192549 | 8/1986 | European Pat. Off. | 359/871 |
| 2499483 | 8/1982 | France | B60R 1/06 |
| 2508397 | 12/1982 | France | 359/881 |
| 3328432 | 2/1985 | Germany | 359/871 |
| 3341611 | 8/1985 | Germany | 359/871 |
| 3341612 | 8/1985 | Germany | 359/871 |
| 0122047 | 6/1986 | Japan | 359/875 |
| 1219173 | 1/1971 | United Kingdom | 248/549 |
| 2041857 | 9/1980 | United Kingdom | B60R 1/06 |

*Primary Examiner*—Paul M. Dzierzynski
*Assistant Examiner*—John Juba, Jr.
*Attorney, Agent, or Firm*—Young & Basile, P.C.

[57] ABSTRACT

A side mounted vehicular rear view mirror of the type which comprises a hollow tubular steel gooseneck support arm which can be rotated forwardly or rearwardly relative to a clamp type mount on the vehicle body to fold the mirror against the vehicle body side to prevent damage to the mirror in, for example, a vehicle carwash or other narrow passageway. The clamping structure comprises a mount having longitudinally spaced semi-cylindrical bearing seats adapted to receive a length of the gooseneck arm and a spring steel clamp having opposing complemental bearing surfaces and an arcuate detent which engages a straight sides slot formed in the gooseneck arm where it overlies the spaced apart bearing seats. The spring clamp flexes to provide a relatively high break away torque and a relatively low continued rotation torque.

16 Claims, 3 Drawing Sheets

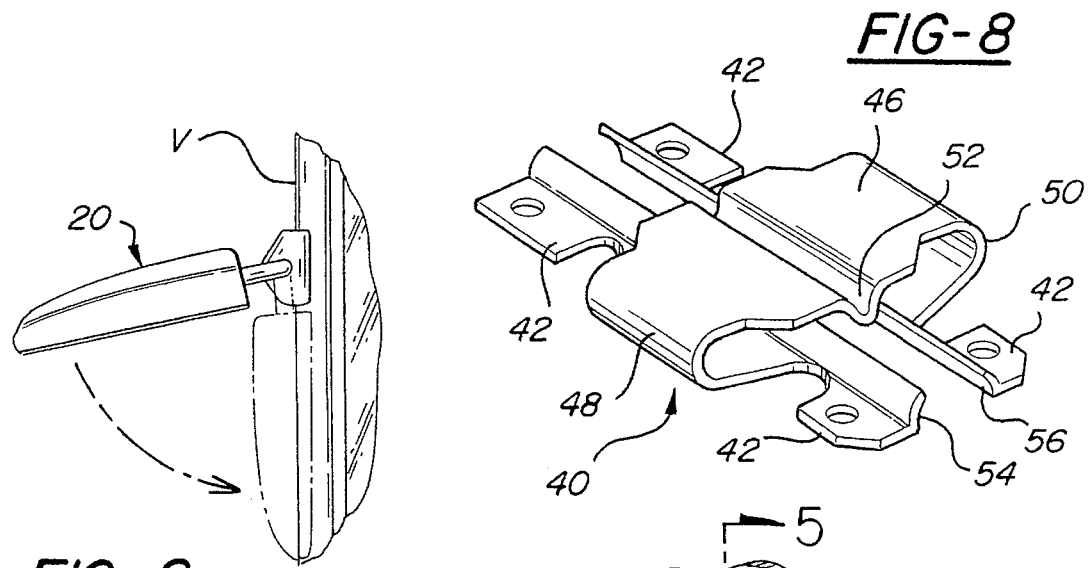
FIG-8
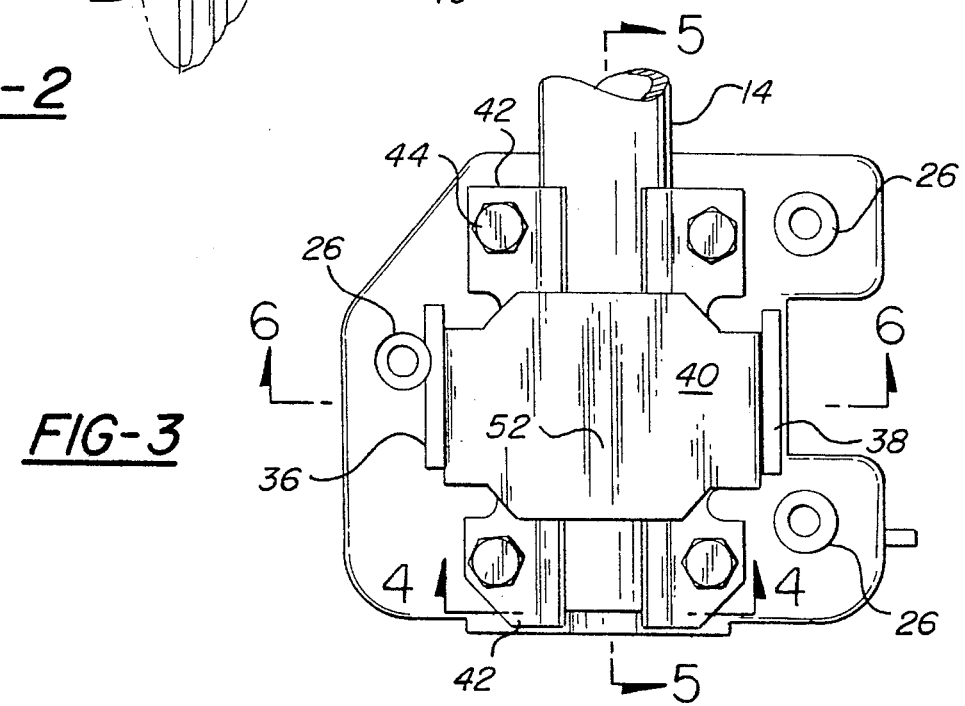
FIG-2
FIG-3
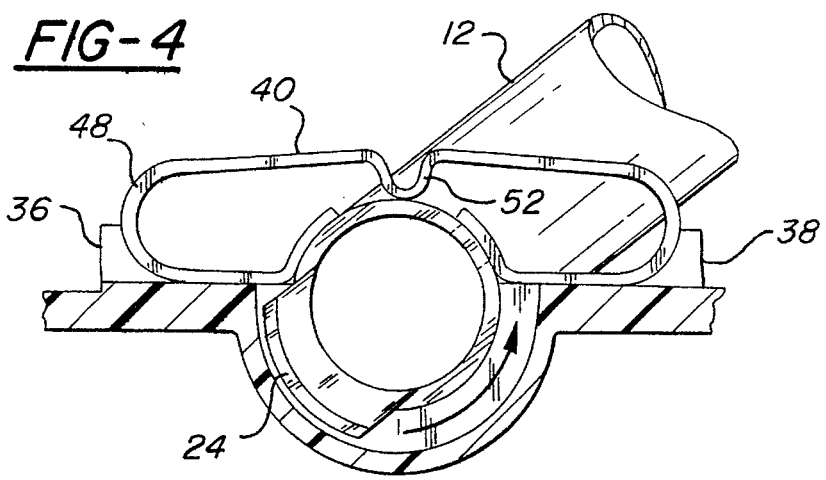
FIG-4

SPRING DETENT FOR FOLDABLE SIDE MOUNT REAR VIEW MIRROR

FIELD OF THE INVENTION

This invention relates to side-mounted vehicular rear view mirrors of the type in which the mirror housing is mounted on a gooseneck support arm which is rotatable relative to a bodyside mount to permit the mirror housing to be folded forwardly or rearwardly relative the vehicle body. More particularly, the invention provides an improved mechanical detent for yieldably locating the gooseneck and mirror housing in a predetermined normal viewing position relative to the vehicle.

BACKGROUND OF THE INVENTION

Many sport and utility vehicles are equipped with relatively large side-mounted rear view mirrors of a type which comprises a mirror housing mounted on a hollow "gooseneck" support arm. This term "gooseneck" is used because the arm is bent at a right angle to provide a first upright length which is secured to the vehicle bodyside by means of a mounting assembly and a second, normally outwardly extending length which is attached to the mirror housing or, more accurately, a structure within the housing. It is desirable to mount the gooseneck arm to the body side mount assembly in such a way as to permit the mirror assembly to be folded inwardly toward the vehicle bodyside, thus reducing the overall width of the vehicle where, for example, it is desired to pass the vehicle through an automatic carwash or to travel through a narrow passageway for other reasons which put side mounted mirrors at risk.

It is common in such an arrangement to provide a mechanical detent which assists the operator of the vehicle in finding the normal viewing position when returning the mirrors from the folded position. U.S. Pat. No. 5,028,029, issued Jul. 2, 1991 to Marlon E. Beck et al. illustrates one way of providing such a detent. In the Beck patent, the upright length of the gooseneck is provided with a longitudinally fluted or grooved terminal portion which cooperates with detent ribs on one or more plastic clamp members. The ribs fit into grooves on the arm to define the normal viewing position and to yieldably permit rotation of the gooseneck arm relative to the clamp when folding of the mirror is desired.

Another detent mechanism for vehicle rear view mirrors is illustrated in U.S. Pat. No. 4,477,199, issued Oct. 16, 1984 to Manzoni. Manzoni illustrates a mirror support arm having both detent grooves and protrusions which cooperate with bosses on a flange which resiliently contacts the mirror support during rotation thereof.

Both the Beck and Manzoni detents are relatively complex in design and appear to provide relatively soft detents. These structures also appear to provide only limited control over breakaway and rotation torques; i.e., the relatively high torque which is needed to bring the arm out of the detent and the relatively low but still significant torque which is required to produce continuing rotation of the arm relative to the bodyside clamp after the detent has been disengaged. It is, of course, desirable to produce an assembly in which these torque numbers are relatively predictable and stable over a range of manufacturing and assembly tolerances as well as operating temperatures.

SUMMARY OF THE INVENTION

The subject invention provides an improved detent mechanism for outside rear view vehicular mirrors of the foldable gooseneck type. In general, this is achieved by means of an improved detent mechanism which comprises a longitudinal slot formed through the side wall of the upright length of the gooseneck support arm, at least one semi-cylindrical bearing seat formed in a bodyside mount to receive and support the upright length of the gooseneck arm for rotation therein, and a spring clamp having opposed feet which are secured to the bodyside mount on opposite sides of the bearing seat and a spring section between the feet which is raised above the feet to clamp the gooseneck arm and which exhibits a longitudinal detent which cooperates with the slot to yieldably maintain the gooseneck support arm in a predetermined viewing position but to permit rotation of the support arm from the detented position. Both breakaway and continued rotation torques are, as a result of the structure of the subject invention, predictable over a wide range of manufacturing and assembly tolerances as well as operating temperature.

In the preferred embodiment described herein, the bodyside mount is formed to provide a pair of spaced apart bearing seats separated by a relieved area. The spring clamp, preferably formed by suitable stamping and bending operations from a single piece of spring steel, exhibits complemental opposed bearing surfaces, widely spaced support feet for attachment purposes, opposed spring flexors and a central spring section in which are arcuate detent is formed. The slot in the upright length of the gooseneck arm is preferably formed by a piercing operation to exhibit straight sides into which the relatively curved surface of the spring clamp extends. This combination has been found to provide not only predictable and appropriate breakaway torque, but also a very positive detent action in which the gooseneck arm virtually "jumps" into the predetermined detented position as rotation of the arm approaches said position. As illustrated in the accompanying drawing and as further described herein, the invention is preferably implemented in an outside rear view mirror for sport/utility vehicles wherein the gooseneck arm carries a relatively large rear view mirror assembly comprising a rigid metal armature which is secured such as by welding to the outwardly extending length of the gooseneck arm. As shown in FIG. 1, the armature may further and by way of example carry a conventional two-axis motor assembly, a housing and a mirror plate. Since the gooseneck arm is hollow over its entire length, the wiring for the motors may pass entirely through the gooseneck arm for convenience of assembly and post-assembly protection.

BRIEF DESCRIPTION OF THE DRAWING

FIG. 2 is a plan view of a mirror construction in accordance with the invention illustrating the manner in which folding of the mirror against the vehicle bodyside is achieved;

FIG. 3 is a side elevational view of the structure for mounting the mirror on the vehicle;

FIGS. 4, 5 and 6 are cross sectional views taken respectively on lines 4—4, 5—5 and 6—6 of FIG. 3;

FIG. 8 is a perspective view of a spring clamp utilized in the mirror construction.

DETAILED DESCRIPTION OF THE ILLUSTRATIVE EMBODIMENT

Figure 1:
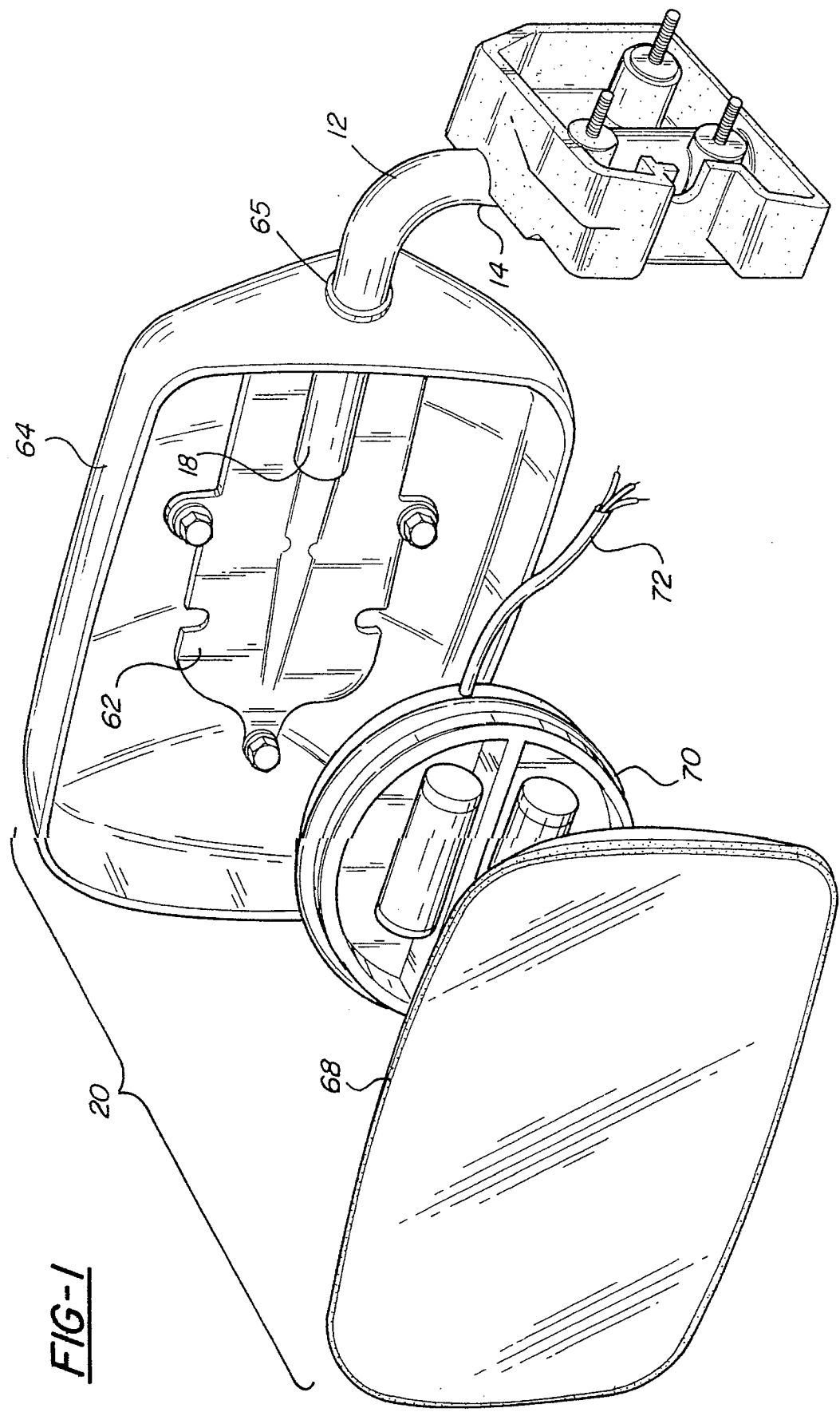
FIG. 1 is a perspective partially exploded view of an illustrative embodiment of the invention.

Referring to the drawings there is shown a side-mounted vehicular rear view mirror structure 10 comprising a hollow tubular "gooseneck" steel support arm 12, a body side mount 16, an outboard mirror assembly 20, and a spring clamp 40.

Gooseneck arm 12 has a first essentially upright length 14 which is rotatably clamped to vehicle body side mount 16 and an outwardly extending length 18 to which is fixedly secured the rear view mirror assembly 20. The upright length 14 of the gooseneck arm 12 defines an axis of rotation about which the mirror may be folded forwardly or rearwardly, as shown in FIG. 2, toward the side of the vehicle V on which it is mounted. Such rearward folding permits the vehicle equipped with the mirror 10 to more easily and safely pass through an automatic carwash or other narrow passageway which might cause physical conflict with the mirror structure and such forward folding precludes damage to the mirror if the mirror inadvertently encounters a solid object when the vehicle is moving in a reverse direction.

As hereinafter described, the mirror mount is mechanically detented to provide a normal operational position of the mirror assembly 20 relative to the vehicle V to which the mirror assembly is easily and positively restored after forward or rearward folding. Moreover, the detent resists the folding movement with a relatively high "breakaway" torque. However, after the breakaway torque has been overcome, the detenting arrangement hereinafter described permits the mirrors to be rotated with less torque.

As shown in the drawing, the gooseneck arm 12 is formed from hollow steel of about 0.75 inches outside diameter and about 1/16th of an inch in wall thickness. The gooseneck arm 12 is bent approximately midway at about 90 degrees to form the normally upright and outwardly extending portions 14 and 18, respectively. It is to be understood that the terms "upright" and "outwardly extending," as used herein, are chosen for the purpose of describing the orientation of the mirror structure 10 when mounted on the side of a conventional vehicle V sitting with all four wheels on level ground and the mirror assembly 20 in the normal unfolded viewing position.

Figure 5:
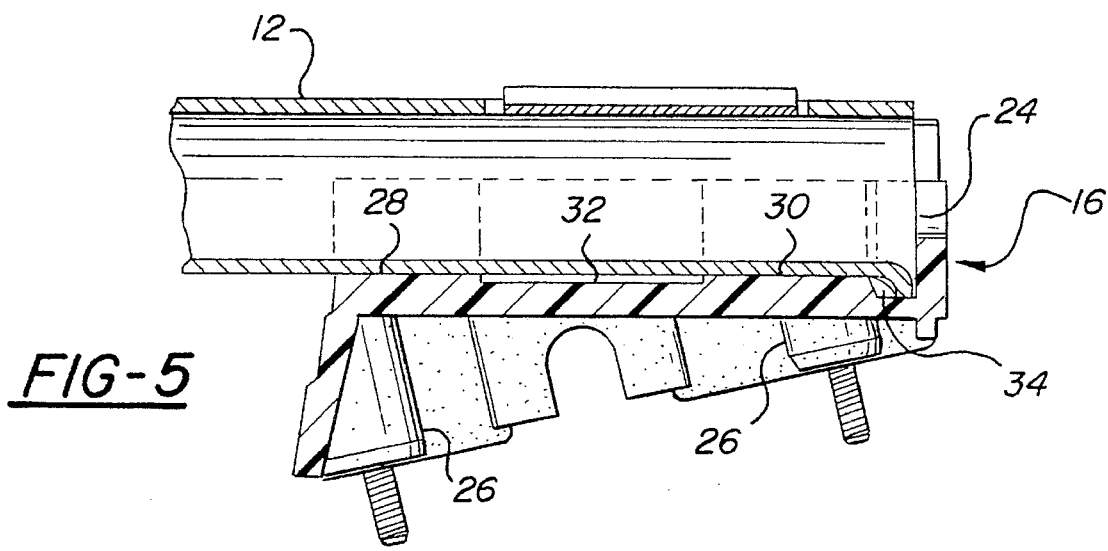

In accordance with the objectives of the invention, a slot 22 of approximately 1½ inches in length is formed such as by piercing through the side wall of the portion 14 of the gooseneck arm 12 at a position beginning approximately ½ inch from the lower terminal end of the portion 14. As shown in FIGS. 4 and 5, the lower terminal end of portion 14 is flared by means of a conventional mechanical operation to form a flared end 24.

Body side mount 16 is preferably formed of reinforced injection molded plastic and exhibits screw bosses 26 by which the mount may be firmly and securely attached to the side surface of a conventional automotive vehicle V. Mount 16 has formed therein a semi-cylindrical portion 27 defining axially spaced-apart semi-cylindrical bearing seats 28 and 30 separated by a shallow relief 32 of approximately ⅞ of an inch in length. At the lower end of bearing seat 30 is formed a pocket 34 of greater depth than that of the relief 32 to receive the flared end 24 of the gooseneck arm portion 14 therein to permit limited angular travel thereof and to provide a rotation stop when the limit of travel is reached in either direction. Integral fences 36 and 38 are formed in the exposed top surface of the mount 16 at oppositely outboard positions relative to the relief 32 for purposes to be described.

As shown in FIG. 8, spring clamp 40 is formed from a single piece of spring steel by suitable stamping and forming operations which will be apparent to those skilled in the metal stamping and forming arts. As shown in FIGS. 3 and 8, the clamp 40 exhibits four rectangularly arranged feet 42, each foot being provided with a mounting hole which permits the clamp 40 to be mounted with screws on the exposed top surface of the bodyside mount 16 directly over the longitudinal arrangement of bearing seats 28,30 and relief 32. The spring clamp 40 further exhibits a central spring portion 46 which has a height slightly less than the length of slot 22 and is raised above the feet 42 approximately ¼ of an inch by bowed arcuate flexor portions 48 and 50. Flexor portions 48 and 50 are formed by folding the spring steel material back on itself from both the left and right extremities during manufacture. Spring portion 46 is configured to define an arcuate central detent 52 extending the full height of the spring portion. In the assembled condition of the spring clamp and the body mount, detent 52 is positioned in alignment with the axis of rotation and in overlying coextensive relation to slot 22. Detent 52 includes relatively angled side wall portions 52a which have an included angle which is precisely controlled at about 70°; for example, the tolerance for this angle is preferably no more than about 1 or 2 degrees.

The terminal edges of the spring clamp 40 are continuous between the feet and are bent to form arcuate and full length opposed arcuate bearing surface portions 54 and 56 which form arcuate continuations of the arcuate surface of bearing seats 28 and 30 of body side mount 16 and cooperate with the bearing seats 28 and 30 when the spring clamp 40 is mounted by means of screws 44 on the top surface of the mount 16 to clamp the gooseneck arm portion 14 between the clamp 40 and the body mount 16. The sizing of the clamp is such that a small clearance between the feet 42 and the top surface of the clamp 16 is produced when the assembly is placed into position for assembly. As the screws 44 which are used to mount the clamp 40 to the body side mount 16 are driven home, the bearing surfaces 54 and 56 flex outwardly to accommodate the gooseneck arm portion 14, and the flexors 48 and 50 spread toward and adjacent the fences 36 and 38. Thereafter, the fences inhibit further outward expansion of the clamp 40 such that rotation of the gooseneck arm relative to the detent 52 forces the center of the spring clamp 40, i.e., that portion in which the detent 52 is formed, to raise upwardly to provide the breakaway torque. The angular rotation limiter referred to earlier is provided when the flared end 24 of the gooseneck arm 16 encounters the respective adjacent foot 42 of the overlying spring clamp 40.

Figure 6:
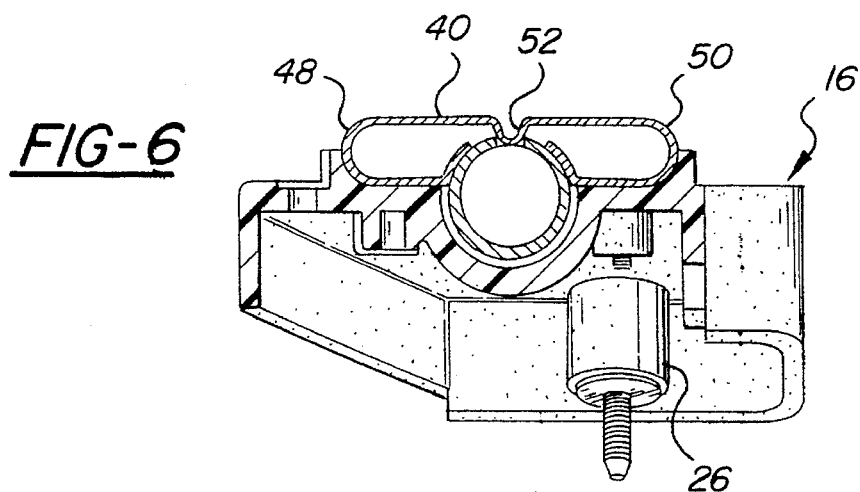
Figure 7:
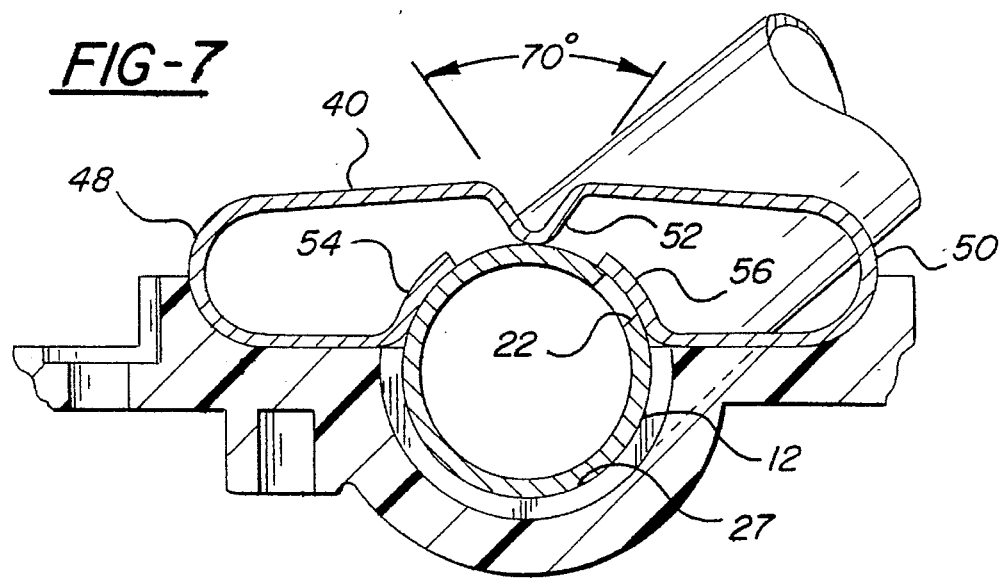
FIG. 7 illustrates the mirror structure in a detented position.

The flexor portions 48 and 50 of the spring clamp may be formed in various configurations to produce varying operating characteristics. As shown in FIGS. 4, 6 and 7, the flexors of the spring clamp may be symmetrical; i.e., of constant radius, to provide a relatively firm spring force. The flexors may also be asymmetrical; i.e., formed with a non-constant radius to provide a softer detent action.

Referring now to the details of the mirror assembly 20, a steel armature plate 62 is welded to the terminal end of the gooseneck arm portion 18. A plastic mirror housing 64 is attached by means of screws to the armature 62 and a rubber grommet 65 provides a seal where the gooseneck arm 12 passes through the housing 64. Mirror plate 68 is operated within the periphery of the mirror housing 64 by conventional two axis motors 70, electrical power for the motors 70 being provided by wiring 72 which is routed through the hollow center of the gooseneck arm 12.

In operation, the gooseneck arm 12 is normally clamped between the bearing seats 28 and 30 of the body side mount 16 and the spring clamp 40 with the detent 52 in place within the straight sided slot 22. This places the mirror assembly 20 in the normal viewing position wherein it extends essentially outwardly from the side of the vehicle. If, for example, it is desirable to pass the vehicle through an automatic carwash, the mirror assembly 20 may be folded back toward the side of the vehicle V by a manual operation which involves rotation of the gooseneck arm 12 about the axis of rotation through the seats 28 and 30. The initial rotation is resisted by a breakaway torque of approximately 165 inch pounds with a tolerance of about plus or minus 40 inch pounds. After the detent 42 of the spring clamp 40 clears the slot 22, continuing torque of about 25 inch pounds is necessary to fold the mirror assembly 20 in either a forward or a rearward direction against the side of the vehicle V.

It is to be understood that specific configurations, dimensions, torque values and materials have been provided herein for the purpose of fully disclosing the invention in accordance with the patent laws but that such disclosure details are not to be construed in a limiting sense.

I claim:

1. A side-mounted vehicular rear view mirror of the type which comprises a hollow gooseneck support arm secured to a bodyside mount which permits the gooseneck arm and a mirror assembly carried outboard of the vehicle thereby to be folded from a predetermined, mechanically detented viewing position toward the vehicle bodyside, the gooseneck arm having a first, essentially upright length which is adapted to be secured to said mount and, integral therewith but angularly displaced relative thereto, a second outwardly extending length adapted to carry said mirror assembly wherein the improvement comprises:

a longitudinal detent structure formed in the side wall of the upright length of said gooseneck arm;

a semi-cylindrical bearing surface formed in said body mount to receive and support said upright length for rotation therein; and a spring clamp having opposed feet secured to said bodyside mount on opposite sides of said surface, a resilient spring portion clamping said upright length into said surface, and flexor portions interconnecting the spring portion and said feet, said spring portion having a detent structure formed therein which is cooperable with said gooseneck arm detent structure to yieldably maintain said gooseneck arm in said viewing position and to yield as permitted by said flexor portions to permit the folding of said arm relative to said vehicle body side.

2. Apparatus as defined in claim 1 further including a pair of longitudinally extending and opposed bearing surfaces formed by said spring clamp between said opposed feet and embracing circumferentially spaced portions of said gooseneck arm.

3. Apparatus as defined in claim 1 further including a mirror assembly mounted on the outwardly extending length of said gooseneck arm.

4. Apparatus as defined in claim 3 including an armature of rigid material fixedly secured to said gooseneck arm and adjustable mirror means carried by said armature.

5. A side-mounted vehicular rear view mirror of the type which comprises a hollow gooseneck support arm secured to a bodyside mount which permits the gooseneck arm and a mirror assembly carried outboard of the vehicle thereby to be folded from a predetermined, mechanically detented viewing position toward the vehicle bodyside, the gooseneck arm having a first, essentially upright length which is adapted to be secured to said mount and, integral therewith but angularly displaced relative thereto, a second outwardly extending length adapted to carry said mirror assembly wherein the improvement comprises:

a longitudinal detent structure formed in the side wall of the upright length of said gooseneck arm;

a semi-cylindrical bearing seat formed in said bodyside mount to receive and support said upright length for rotation therein; and a spring clamp having opposed feet secured to said bodyside mount on opposite sides of said seat and a resilient spring portion extending between said opposed feet and clamping said upright length into said seat, said spring portion having a detent structure formed therein which is cooperable with said gooseneck arm detent structure to yieldably maintain said gooseneck arm in said viewing position and to yield to permit the folding of said arm relative to said vehicle body side;

said gooseneck arm detent structure comprising a slot which is essentially straight-sided and said spring portion detent structure being arcuate in configuration to extend partially into said straight-sided slot.

6. Apparatus as defined in claim 5 wherein said spring clamp is metal.

7. Apparatus as defined in claim 5 wherein said spring portion detent structure includes relatively angled side wall portions which define an included angle on the order of about 70 degrees.

8. A side-mounted vehicular rear view mirror of the type which comprises a hollow gooseneck support arm secured to a bodyside mount which permits the gooseneck arm and a mirror assembly carried outboard of the vehicle thereby to be folded from a predetermined, mechanically detented viewing position toward the vehicle bodyside, the gooseneck arm having a first, essentially upright length which is adapted to be secured to said mount and, integral therewith but angularly displaced relative thereto, a second outwardly extending length adapted to carry said mirror assembly wherein the improvement comprises:

a longitudinal detent structure formed in the side wall of the upright length of said gooseneck arm;

two spaced apart, semi-cylindrical bearing seats formed in said bodyside mount to receive and support said upright length for rotation therein; and a spring clamp having opposed feet secured to said bodyside mount on opposite sides of said seats and a resilient spring portion extending between said opposed feet and clamping said upright length into said seats, said spring portion having a detent structure formed therein which is cooperable with said gooseneck arm detent structure to yieldably maintain said gooseneck arm in said viewing position and to yield to permit the folding of said arm relative to said vehicle body side.

9. Apparatus as defined in claim 8 wherein the longitudinal length of said gooseneck arm detent structure is greater than the spacing between said bearing seats.

10. Apparatus as defined in claim 8 further including a relief formed in said mount between said bearing seats to provide a clearance between said relief and said gooseneck arm between said bearing seats.

11. A side-mounted vehicular rear view mirror of the type which comprises a hollow gooseneck support arm secured to a bodyside mount which permits the gooseneck arm and a mirror assembly carried outboard of the vehicle thereby to be folded from a predetermined, mechanically detented viewing position toward the vehicle bodyside, the gooseneck arm having a first, essentially upright length which is adapted to be secured to said mount and, integral therewith but angularly displaced relative thereto, a second outwardly extending length adapted to carry said mirror assembly wherein the improvement comprises:

a longitudinal detent structure formed in the side wall of the upright length of said gooseneck arm;

a semi-cylindrical bearing seat formed in said body mount to receive and support said upright length for rotation therein; and a spring clamp having opposed feet secured to said bodyside mount on opposite sides of said seat and a resilient spring portion extending between said opposed feet and clamping said upright length into said seat, said spring portion having a detent structure formed therein which is cooperable with said gooseneck arm detent structure to yieldably maintain said gooseneck arm in said viewing position and to yield to permit the folding of said arm relative to said vehicle body side;

said spring clamp comprising a body of spring steel having opposed ends which are folded back to form said opposed feet and opposed arcuate spring flexors, the feet longitudinally extending beyond the resilient spring portion of said spring steel body.

12. Apparatus as defined in claim 11 further including rigid barrier means formed on said mount outwardly of but in contact with said flexors to limit outward movement thereof during resilient flexing of said spring clamp.

13. A side-mounted vehicular rear view mirror of the type which comprises a hollow gooseneck support arm secured to a bodyside mount which permits the gooseneck arm and a mirror assembly carried outboard of the vehicle thereby to be folded from a predetermined, mechanically detented viewing position toward the vehicle bodyside, the gooseneck arm having a first, essentially upright length which is adapted to be secured to said mount and, integral therewith but angularly displaced relative thereto, a second outwardly extending length adapted to carry said mirror assembly wherein the improvement comprises:

a longitudinal detent structure formed in the side wall of the upright length of said gooseneck arm;

a semi-cylindrical bearing seat formed in said bodyside mount to receive and support said upright length for rotation therein; and a spring clamp having opposed feet secured to said bodyside mount on opposite sides of said seat and a resilient spring portion extending between said opposed feet and clamping said upright length into said seat, said spring portion having a detent structure formed therein which is cooperable with said gooseneck arm detent structure to yieldably maintain said gooseneck arm in said viewing position and to yield to permit the folding of said arm relative to said vehicle body side;

the terminal end of said gooseneck arm adjacent said upright portion being flared.

14. Apparatus as defined in claim 13 including a pocket formed in said bodyside mount to receive said flared end and to provide an angular travel limiter.

15. A side-mounted vehicular rear view mirror of the type which comprises a hollow gooseneck support arm secured to a body mount which permits the gooseneck arm and a mirror assembly carried outboard of the vehicle thereby to be folded from a predetermined mechanically detented viewing position toward the vehicle body side, the gooseneck arm having a first essentially upright length which is adapted to be secured to said mount and, integral therewith but angularly displaced relative thereto, a second outwardly extending length adapted to carry said mirror assembly, characterized in that:

the upright length of the gooseneck arm is pivotally secured to the body mount by a single piece spring clamp; and the spring clamp includes a mounting portion adapted to be mounted to the body mount, a spring portion overlying the mounting portion and including a detent for coaction with a detent on the upright length of the gooseneck arm to define the mechanically detented position of the mirror assembly, opposed arcuate bearing surface portions frictionally engaging circumferentially spaced portions of the upright length of the gooseneck arm to apply a resistive torque to the upright length when the mirror assembly is moved out of the mechanically detented viewing position, and folded flexor portions interconnecting the spring portion and the bearing surface portions.

16. A side-mounted vehicular rear view mirror of the type which comprises a hollow gooseneck support arm secured to a body mount which permits the gooseneck arm and a mirror assembly carried outboard of the vehicle thereby to be folded from a predetermined mechanically detented viewing position toward the vehicle body side, the gooseneck arm having a first essentially upright length which is adapted to be secured to said mount and, integral therewith but angularly displaced relative thereto, a second outwardly extending length adapted to carry said mirror assembly, characterized in that:

the upright length of the gooseneck arm is pivotally secured to the body mount by a single piece spring clamp;

the spring clamp includes a mounting portion adapted to be mounted to the body mount, a spring portion overlying the mounting portion and including a detent for coaction with a detent on the upright length of the gooseneck arm to define the mechanically detented position of the mirror assembly, and opposed arcuate bearing surface portions frictionally engaging circumferentially spaced portions of the upright length of the gooseneck arm to apply a resistive torque to the upright length when the mirror assembly is moved out of the mechanically detented viewing position;

the upright length of the gooseneck arm has a circular cross-sectional configuration;

the body mount defines a semi-cylindrical bearing seat to rotationally receive the upright length of the gooseneck arm; and the bearing surface portions of the spring clamp are positioned on opposite sides of the semi-cylindrical bearing seat and form arcuate continuations of the arcuate surface of the bearing seat.

* * * * *